(12) United States Patent
Iwashita

(10) Patent No.: US 6,897,647 B2
(45) Date of Patent: May 24, 2005

(54) REVOLUTION DETECTING SENSOR WITH RECESSED GUIDE

(75) Inventor: Takaki Iwashita, Hisai (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/396,817

(22) Filed: Mar. 26, 2003

(65) Prior Publication Data
US 2003/0193328 A1 Oct. 16, 2003

(30) Foreign Application Priority Data
Apr. 16, 2002 (JP) ......................... 2002-113476

(51) Int. Cl.⁷ .............................. G01B 7/14; G01R 33/06
(52) U.S. Cl. ................................ 324/207.2; 324/207.25
(58) Field of Search .......................... 324/207.2, 207.21, 324/207.25, 173, 174

(56) References Cited

U.S. PATENT DOCUMENTS

| | | | | |
|---|---|---|---|---|
| 5,121,289 A | * | 6/1992 | Gagliardi | 361/679 |
| 5,394,081 A | * | 2/1995 | Ogawa et al. | 324/174 |
| 5,414,355 A | * | 5/1995 | Davidson et al. | 324/207.2 |
| 5,416,410 A | * | 5/1995 | Kastler | 324/174 |
| 5,581,179 A | * | 12/1996 | Engel et al. | 324/207.2 |
| 5,631,556 A | * | 5/1997 | Shibata | 324/174 |
| 5,631,557 A | | 5/1997 | Davidson | |
| 5,744,951 A | * | 4/1998 | Babin et al. | 324/173 |
| 5,821,744 A | | 10/1998 | Shinjo et al. | |
| 5,912,556 A | * | 6/1999 | Frazee et al. | 324/207.2 |
| 6,291,990 B1 | * | 9/2001 | Nakane et al. | 324/207.25 |
| 6,326,779 B1 | * | 12/2001 | Shinjo et al. | 324/207.21 |

FOREIGN PATENT DOCUMENTS

| | | |
|---|---|---|
| DE | 3827937 A1 | 2/1990 |
| JP | 61-57548 U | 4/1986 |
| JP | 2176483 | 7/1990 |
| JP | 3-91969 | 9/1991 |
| JP | 3-91969 U | 9/1991 |
| JP | 8-247786 | 9/1996 |
| JP | 8-327393 | 12/1996 |
| JP | 10-260194 | 9/1998 |
| JP | 10282475 A | 10/1998 |
| JP | P2000-180460 A | 6/2000 |
| JP | 2000-180460 A | 6/2000 |
| JP | 2000-206130 A | 7/2000 |
| JP | 2002-221529 | 8/2002 |
| JP | 2002-221529 A | 8/2002 |
| JP | 2003-307522 | 10/2003 |

* cited by examiner

Primary Examiner—N. Le
Assistant Examiner—Reena Aurora
(74) Attorney, Agent, or Firm—McDermott Will & Emery LLP

(57) ABSTRACT

A revolution detecting sensor includes a Hall IC facing a detection target, a magnet positioned behind the Hall IC and applying a bias magnetic field, and a substrate provided with a detecting circuit. The revolution detecting sensor is configured such that a lead terminal from the Hall IC bypasses the magnet, to be guided to the substrate. In a magnet holder holding the magnet, a recessed guide guiding the lead terminal is formed, and a pressing member is provided. Thus, a tip end portion of the lead terminal can be held in a prescribed position, and an operation for attachment to the substrate can easily be performed.

1 Claim, 6 Drawing Sheets

FIG.6
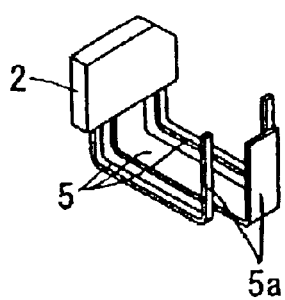
FIG.7A
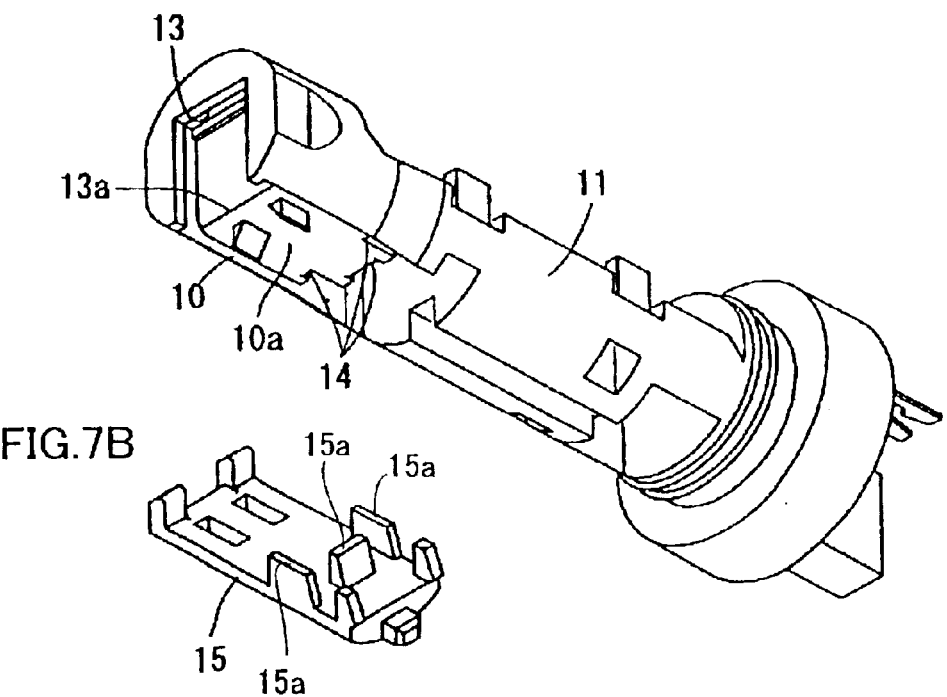
FIG.7B
FIG.8
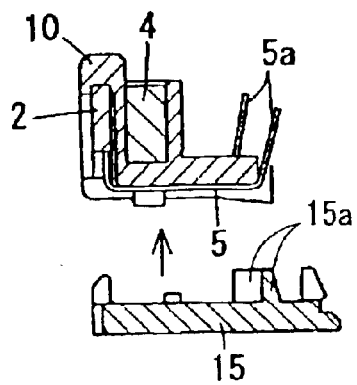

REVOLUTION DETECTING SENSOR WITH RECESSED GUIDE

BACKGROUND OF THE INVENTION

1. Field of the Invention

The present invention relates to a revolution detecting sensor such as a wheel speed sensor, or an engine revolution speed sensor of a motor vehicle.

2. Description of the Background Art

As disclosed in Japanese Patent Laying-Open No. 2000-180460, for example, a revolution detecting sensor constituting a wheel speed sensor includes a detecting portion detecting magnetic fluctuation, to convert to an electric signal. For the detecting portion, a configuration in which a magnet applying a bias magnetic field is provided behind a Hall IC, and a lead terminal from the Hall IC is connected to a circuit on a substrate is adopted, for example.

In a conventional revolution detecting sensor described above, the magnet applying the bias magnetic field to the Hall IC should be positioned behind the Hall IC with respect to a detection target. Therefore, the lead terminal from the Hall IC should go around (bypass) the magnet. Consequently, the lead terminal is connected to the circuit on the substrate in an elongated manner.

Recently, each motor vehicle manufacturer has pursued reduction of the number of components, the size and weight. Such a demand has been directed also to the wheel speed sensor. As the wheel speed sensor is made smaller, a volume for accommodating the component and a method of accommodating the same have increasingly been restricted. With regard to the wheel speed sensor as well, in order to arrange the component in a limited space, the lead terminal is subjected to a variety of bending (forming) processes for arrangement in many cases.

An example is shown in FIGS. 11A and 11B. Here, a Hall IC 2 is fit in front of a magnet holder 10. A lead terminal 5 from Hall IC 2 first suspends from Hall IC 2, and extends along the surface of a wall constituting the bottom of a magnet fit-in hole 12. Then, lead terminal 5 is bent toward the side of a substrate 1 at an end portion of the wall, and inserted for connection into a through hole 3a of a detecting circuit 3. Lead terminal 5 thus exhibits a shape of a cup. Hall IC 2 with cup-shaped lead terminal 5 is fabricated by bending straight lead terminal 5 of Hall IC 2 shown in FIG. 9A to the shape of a cup as shown in FIGS. 9B and 9C. Since lead terminal 5 is thin and susceptible to deformation, variation in processing is likely, or lead terminal 5 tends to be deformed again during transportation and connection. For example, lead terminal 5 may be deformed in such a manner as shown with a chain line in FIGS. 10A and 10B.

As described above, when lead terminal 5 is attached to holder 10 and substrate 1 while it is not in a prescribed shape, as shown in FIGS. 11A and 11B, a tip end of lead terminal 5 is bent, without properly introduced into through hole 3a of detecting circuit 3 (FIG. 11A). In addition, if insertion of lead terminal 5 is forcibly attempted, lead terminal 5 may depart from the through hole, which will adversely affect a quality in a mold portion of Hall IC 2 (FIG. 11B). Such bending and departing will result in poor connection and a defect. Moreover, workability has been low, because such a defect should be corrected, that is, connected again, for example.

SUMMARY OF THE INVENTION

An object of the present invention is to provide a revolution detecting sensor in which a lead terminal can exhibit a prescribed shape when a Hall IC is arranged in a prescribed position.

In order to solve the above-described problem, in a revolution detecting sensor according to the present invention, when a Hall IC is arranged in a prescribed position, a lead terminal is sandwiched by two members so as to be subjected to forming, to attain a prescribed shape. If the lead terminal is sandwiched by two members, it will be fixed in place. Therefore, the lead terminal is maintained in the prescribed shape, and smoothly inserted into a through hole, for example, in attachment to a substrate. This is advantageous in an automatic assembly, for example.

More specifically, the revolution detecting sensor according to the present invention includes a Hall IC facing a detection target, a magnet positioned behind the Hall IC and applying a bias magnetic field, and a substrate provided with a detecting circuit. A lead terminal from the Hall IC bypasses the magnet, to be guided to the substrate. Magnetic fluctuation due to revolution of the detection target is converted to an electric signal by the Hall IC, which is in turn transmitted to the detecting circuit on the substrate through the lead terminal. In a magnet holder holding the magnet, a recessed guide guiding the lead terminal is formed, and a member defining the bypass path by engaging to the magnet holder to press the lead terminal to the guide is provided. In this configuration, two members for sandwiching and holding the lead terminal described above are constituted with the magnet holder and a defining member.

Preferably, in the revolution detecting sensor, a configuration is adopted, in which the magnet holder includes a fit-in hole for the magnet opening on one face side, and a fit-in hole for the Hall IC opening on the other face side respectively, and the lead terminal follows the cup-shaped bypass path in such a manner that it suspends from the Hall IC, extends along the surface of the wall constituting the bottom of the fit-in hole, bends and rises to the side of the substrate at an end portion of the wall, and is inserted for connection into a through hole on the substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a perspective view of a Hall IC.

FIG. 7A is a perspective view of a magnet holder and a base holder.

FIG. 7B is a perspective view of a pressing member.

FIG. 8 is a cross-sectional view showing an action of the revolution detecting sensor in the embodiment.

DESCRIPTION OF THE PREFERRED EMBODIMENTS

One embodiment of the present invention will be described with reference to FIGS. 1A to 8. The revolution detecting sensor in the present embodiment constitutes a wheel speed sensor P.

Figure 1A:
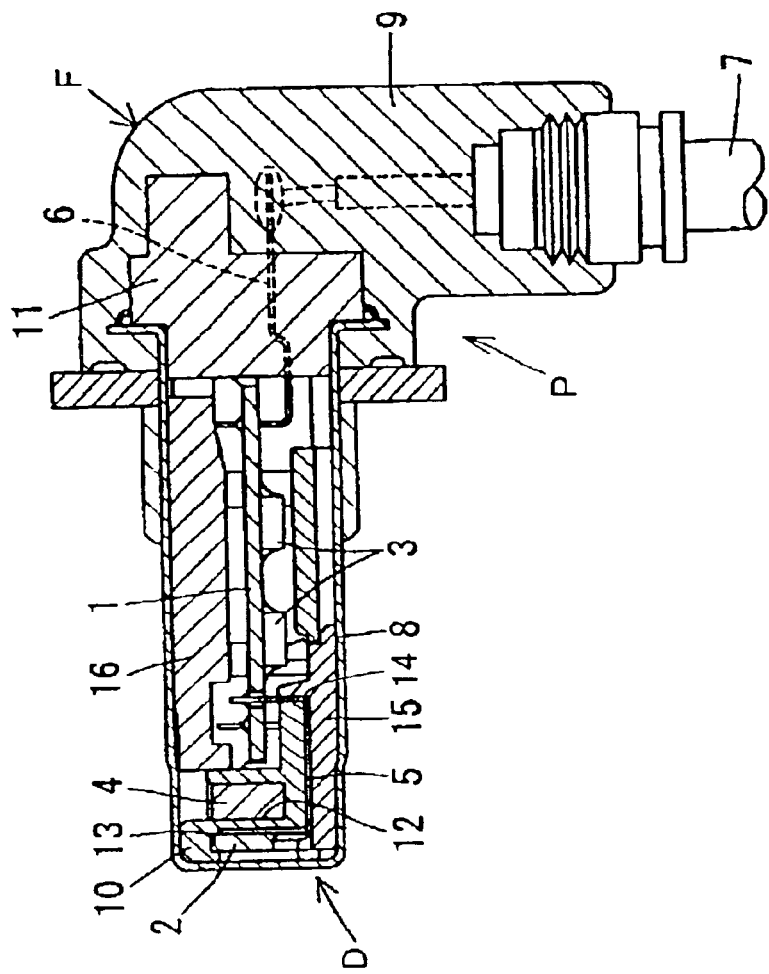
FIG. 1A is a cross-sectional view of a revolution detecting sensor in an embodiment.

Wheel speed sensor P includes a detecting portion D detecting magnetic fluctuation to convert to an electric signal, and a fixing portion F for attaching wheel speed sensor P to a body of the vehicle, for example. In detecting portion D, as shown in FIG. 1A, a magnet 4 applying a bias magnetic field is provided behind Hall IC 2. Lead terminal 5 from Hall IC 2 is connected to detecting circuit 3 on substrate 1.

Figure 1B:
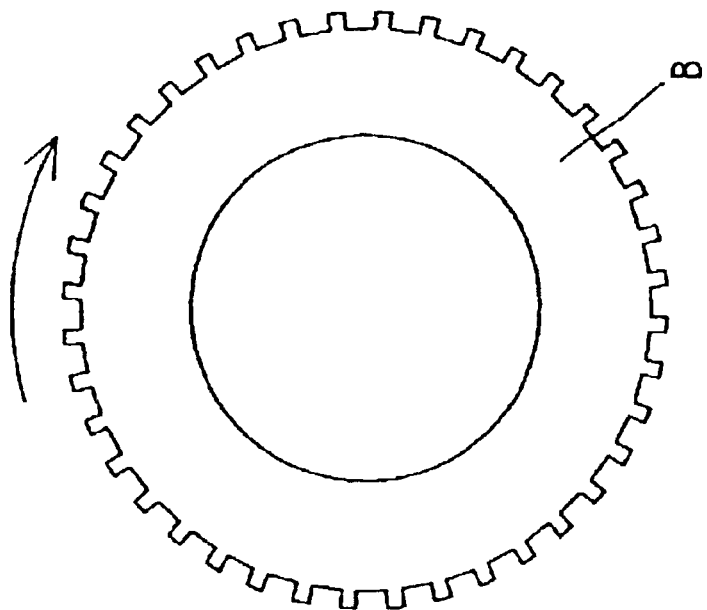
FIG. 1B is a front view of a detection target.

Wheel speed sensor P including Hall IC 2 is provided so as to face a detection target B which rotates, as shown in FIGS. 1A and 1B. In wheel speed sensor P, fluctuation of the bias magnetic field due to revolution of detection target B is detected by Hall IC 2 and detecting circuit 3, and converted to a digital electric signal. The electric signal is transmitted to an external device such as a variety of controllers through a cable (wire harness) 7 via a relay terminal 6. For wheel speed sensor P applying the bias magnetic field, an encoder made of a ferromagnetic material such as iron, which is not magnetized itself, is employed as detection target B.

Figure 2A:
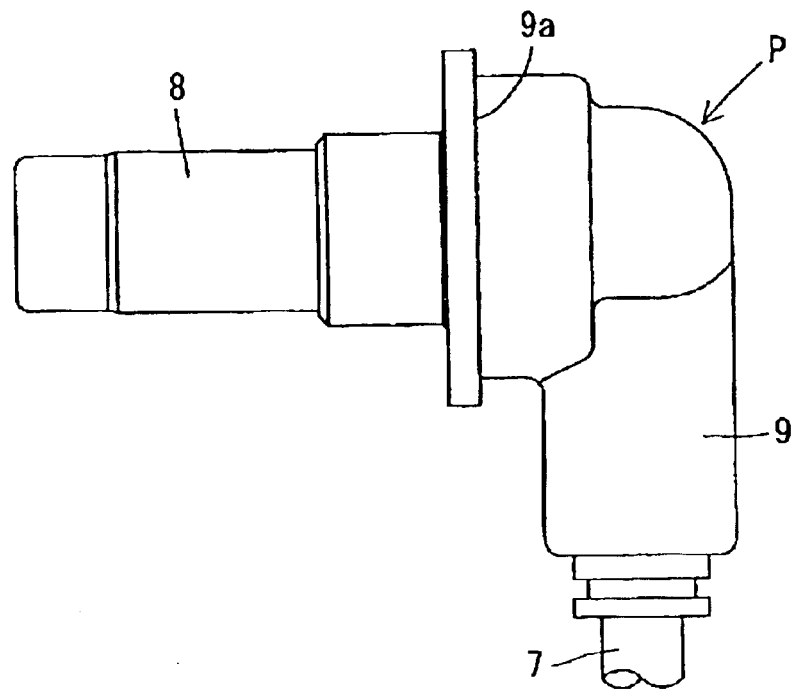
FIG. 2A is a front view of the revolution detecting sensor in the embodiment.
Figure 2B:
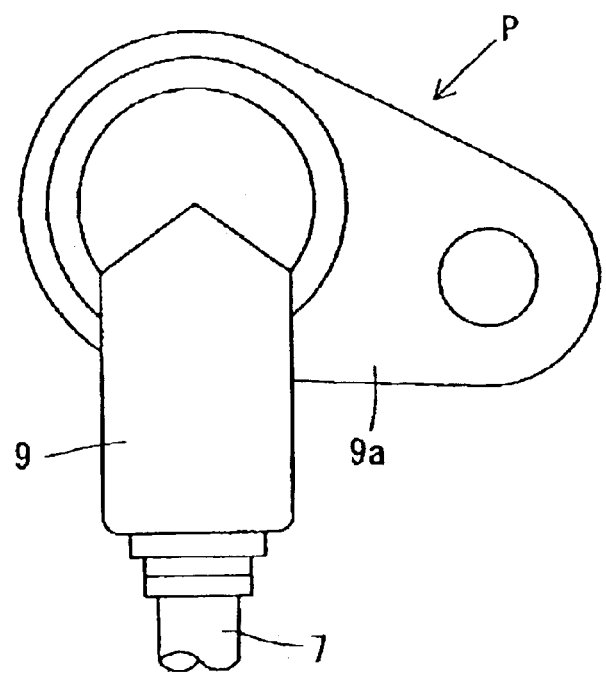
FIG. 2B is a right side view of the revolution detecting sensor in the embodiment.

Substrate 1 is housed in a cylindrical metal case 8 along with Hall IC 2 and magnet 4. While relay terminal 6 from detecting circuit 3 is connected to cable 7, a resin mold coating 9 and a bracket 9a for attachment to the body are applied, as shown in FIGS. 2A and 2B.

Substrate 1 is composed of an epoxy resin plate containing glass fiber. On substrate 1, electronics such as a resistance, a capacitor, or the like are mounted, to constitute detecting circuit 3. In a prescribed position of substrate 1, through hole 3a is formed. A base holder 11 fit in an opening of case 8 is resin-molded. Relay terminal 6 is inserted during molding of the base holder.

Magnet holder 10 positioned within the tip end portion of case 8 is molded integrally with base holder 11 (see FIG. 7A). Magnetic holder 10 includes fit-in hole 12 for magnet 4 opening on one face side (upper side in FIG. 1), and a fit-in hole 13 for Hall IC 2 opening on the other face side (lower side in FIG. 1). As shown in FIG. 6, lead terminal 5 from Hall IC 2 is formed in a shape of a cup, and connected to detecting circuit 3 on substrate 1. Here, as shown in FIG. 1A, lead terminal 5 suspends from Hall IC 2, extends along a surface 10a of the wall constituting the bottom of magnet fit-in hole 12, bends and rises to the side of substrate 1 at the end portion of the wall, and is inserted for connection into through hole 3a of detecting circuit 3.

Figure 5A:
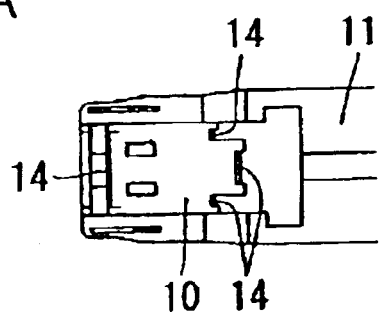
FIG. 5A is a bottom view of the revolution detecting sensor in the embodiment while one portion thereof has been removed.

The tip end portion of lead terminal 5 fits in a recessed guide 14 provided on the surface of the wall of magnet fit-in hole 12 in magnet holder 10, as shown in FIGS. 5A and 7A, and is pressed and restricted by a pressing projection 15a of a pressing member 15. Recessed guide 14 may extend along a direction in which lead terminal 5 extends along a wall surface 10a constituting the bottom of fit-in hole 12 for magnet 4 positioned on the lower face side of magnet holder 10, to reach a corner portion 13a of a lower end of an inner wall of Hall IC 2.

Figure 3A:
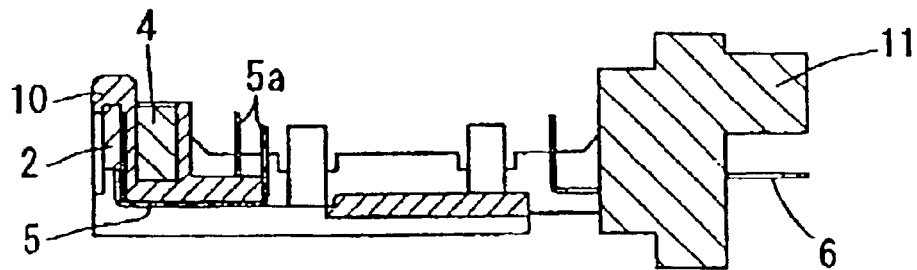
FIGS. 3A to 3D are cross-sectional views illustrating an assembly process step of the revolution detecting sensor in the embodiment.
Figure 3B:
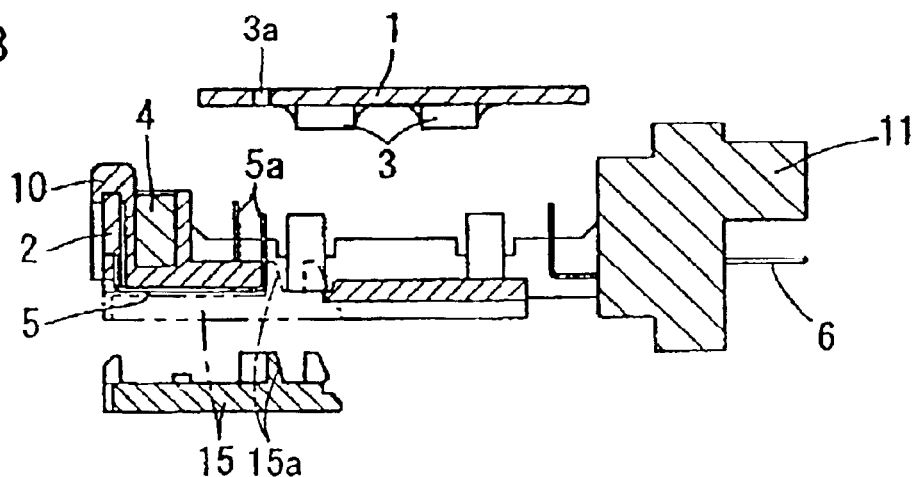

The present embodiment has a configuration described above, and a procedure for assembly will now be described. As shown in FIG. 3A, magnet 4 and Hall IC 2, of which lead terminal 5 is subjected in advance to bending process to achieve a shape as shown in FIG. 6, are fit in magnetic holder 10. Then, as shown in FIG. 3B, pressing member 15 is fit in magnet holder 10 as shown with a chain line in FIG. 3B. Here, even if lead terminal 5 is not in a prescribed cup-shaped form, for example, if a foot portion 5a is wide open as shown in FIG. 8, lead terminal 5 will achieve the prescribed cup-shaped form as in FIG. 3B, because it is guided by recessed guide 14 and restricted by pressing projection 15a as pressing member 15 is fit.

Figure 3C:
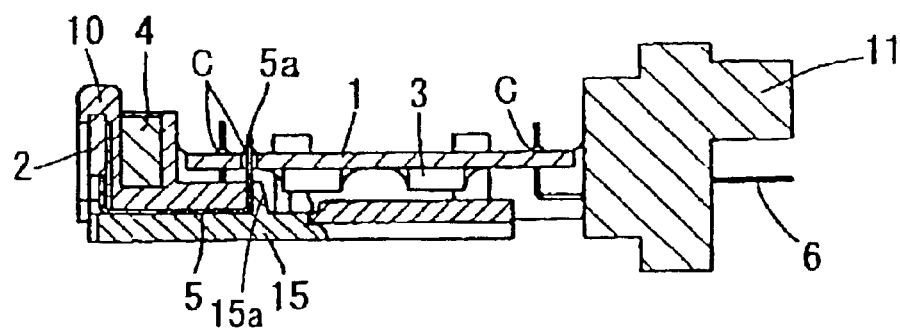
Figure 3D:
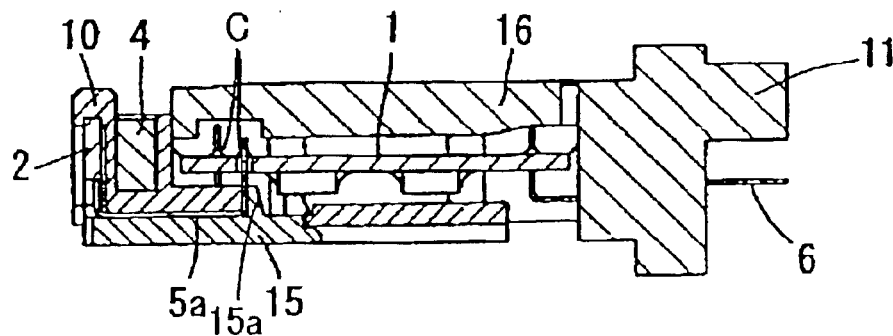
Figure 4A:
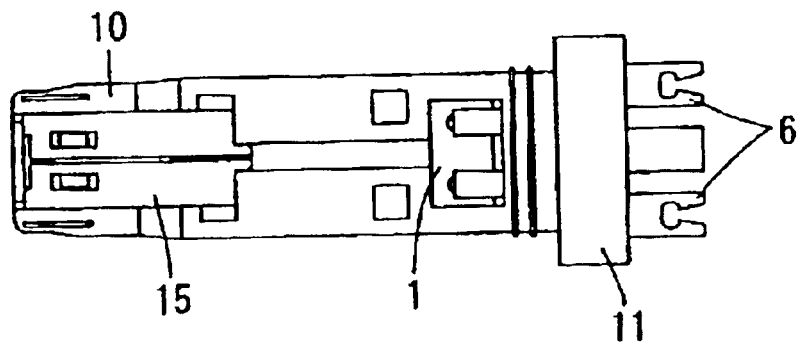
FIG. 4A is a bottom view of the revolution detecting sensor being assembled in the embodiment.
Figure 4B:
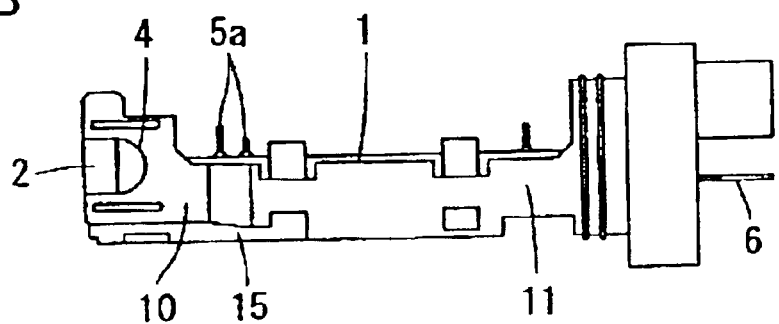
FIG. 4B is a front view of the revolution detecting sensor being assembled in the embodiment.
Figure 5B:
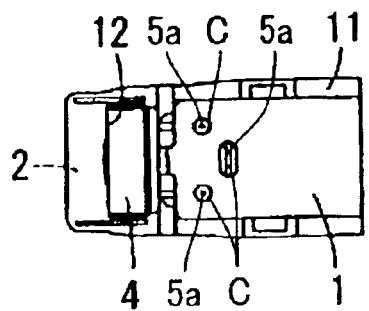
FIG. 5B is a plan view of the revolution detecting sensor in the embodiment while one portion thereof has been removed.
Figure 9A:
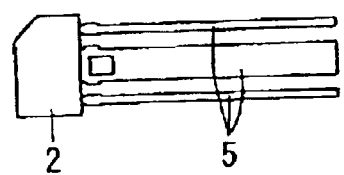
FIG. 9A is a plan view showing the Hall IC before forming of a lead terminal.
Figure 9B:
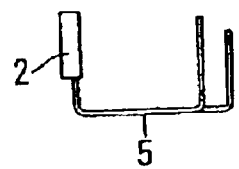
FIG. 9B is a front view of the Hall IC after forming.
Figure 9C:
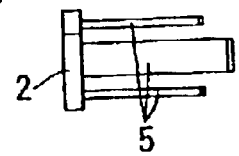
FIG. 9C is a plan view of the Hall IC after forming.
Figure 10A:
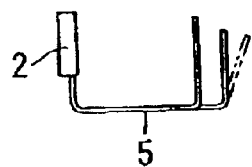
FIG. 10A is a front view showing that the lead terminal of the Hall IC is defective.
Figure 10B:
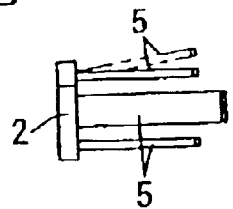
FIG. 10B is a plan view showing that the lead terminal of the Hall IC is defective.
Figure 11A:
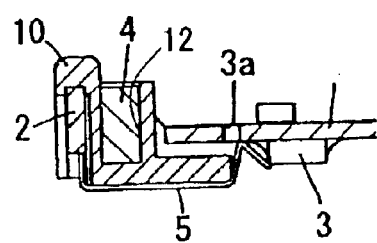
FIGS. 11A and 11B illustrate a problem when the lead terminal of the Hall IC is defective.
Figure 11B:
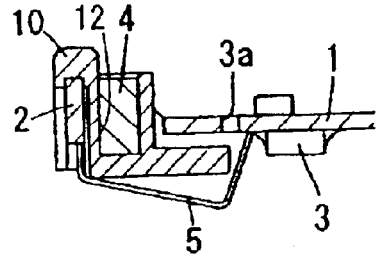

Though substrate 1 is fit as shown in FIGS. 3B and 3C, lead terminal 5 can smoothly be inserted into through hole 3a of substrate 1, because foot portion 5a of lead terminal 5 has been positioned in a prescribed place. As shown in FIGS. 3C and 5B, lead terminal 5 is connected to detecting circuit 3 of substrate 1 by soldering C. In addition, as shown in FIG. 3C, relay terminal 6 is also connected to detecting circuit 3 by soldering C. Thus, a state shown in FIGS. 4A and 4B is achieved. Thereafter, as shown in FIG. 3D, wheel speed sensor P is obtained by fitting a cover 16, and applying case 8 and resin mold coating 9, successively.

As described above, according to the present invention, the lead terminal exhibits a prescribed shape when the Hall IC is arranged in a prescribed position. Therefore, the lead terminal is always arranged in the same position when attached to the Hall IC, regardless of variation in forming the shape of the lead terminal, or variation due to deformation after processing. As a result, an operation for attachment to a component holder of the substrate will be stable, and improved workability and stable quality are achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A revolution detecting sensor comprising:

a Hall IC facing a detection target;

a magnet positioned behind the Hall IC and applying a bias magnetic field; and a substrate provided with a detecting circuit; wherein a lead terminal from said Hall IC bypasses said magnet to be guided to said substrate, magnetic fluctuation due to revolution of said detection target is converted to an electric signal with said Hall IC, and transmitted to the detecting circuit on said substrate through said lead terminal, a magnet holder holding said magnet, said magnet holder including a recessed guide for guiding said lead terminal, and a pressing member defining a bypass path in which the lead terminal is positioned by engaging the magnet holder to press the lead terminal into the guide, wherein said magnet holder includes a fit-in hole for said magnet opening on one face side, and a fit-in hole for said Hall IC opening on another face side respectively, and said lead terminal forms a cup-shaped bypass path in such a manner that said lead terminal suspends from said Hall IC, extends along a surface of a wall constituting a bottom of said fit-in hole, bends and rises to a side of said substrate at an end portion of said wall, and is inserted for connection into a through hole on said substrate.

* * * * *